United States Patent [19]
Cox et al.

[11] Patent Number: 5,506,868
[45] Date of Patent: Apr. 9, 1996

[54] MODEM HAVING AN IMPROVED LINE INTERFACE CIRCUIT, IN PARTICULAR FOR A COMPUTER

[75] Inventors: Robert Cox, Le Pecq; Eric Gradeler, Sceaux; Barry Hochfield, Noisy-Le-Roi; Philippe Le Bars, Elancourt, all of France; Rodger J. Mohme, Santa Cruz County; Steven J. Young, Santa Clara County, both of Calif.

[73] Assignee: Apple Computer, Inc., Cupertino, Calif.

[21] Appl. No.: 296,091

[22] Filed: Aug. 25, 1994

Related U.S. Application Data

[63] Continuation of Ser. No. 899,265, Jun. 16, 1992, abandoned.

[30] Foreign Application Priority Data

Jun. 17, 1991 [FR] France .................................. 91 07365

[51] Int. Cl.$^6$ ................................ H04B 1/38; H04L 5/16
[52] U.S. Cl. ............................ 375/222; 375/377; 379/97; 379/398
[58] Field of Search ................................. 379/98, 93, 97, 379/94, 398, 399; 375/222, 377

[56] References Cited

U.S. PATENT DOCUMENTS

| | | | |
|---|---|---|---|
| 4,841,561 | 6/1989 | Hill | 379/97 |
| 4,868,863 | 9/1989 | Hartley et al. | 379/93 |

OTHER PUBLICATIONS

"Incorporated Protection Circuit with Microcoded Switch Hook and Level Adjustment Functions," IBM Technical Disclosure Bulletin, vol 27, No. 28, pp. 4825–4826 (Jan. 1985).

"Une Interface Ligne Telephonique/Modem," Toute L'Electronique, No. 522, pp. 83–86 (Mar. 1987).

Primary Examiner—Stephen Chin
Assistant Examiner—Hai H. Phan
Attorney, Agent, or Firm—Blakely, Sokoloff, Taylor & Zafman

[57] ABSTRACT

Circuitry is described for providing a telephone line interface circuit of a MODEM for a computer with an AC impedance and DC voltage/current characteristics required by a given type telephone network such that the telephone line interface circuit can be matchingly connected with the given type telephone network. The given type telephone network provides an identification code representative of the required AC impedance and DC voltage/current characteristics. The circuitry comprises a plurality of impedance components that, when connected to the telephone line interface circuit, determine the AC impedance and DC voltage/current characteristics of the telephone line interface circuit. A plurality of terminals are coupled to receive a plurality of control signals associated with the identification code. A switching logic is coupled (1) between the plurality of impedance components and the telephone line interfacing circuit and (2) to the plurality of terminals for selectively connecting the plurality of impedance components to the telephone line interface circuit under the control of the plurality of control signals so as to cause the telephone line interface circuit to have the required AC impedance and DC voltage/current characteristics. An identifying circuit is coupled to the given type telephone network for identifying the required AC impedance and DC voltage/current characteristics by receiving the identification code and converting the identification code into the plurality of control signals.

18 Claims, 4 Drawing Sheets

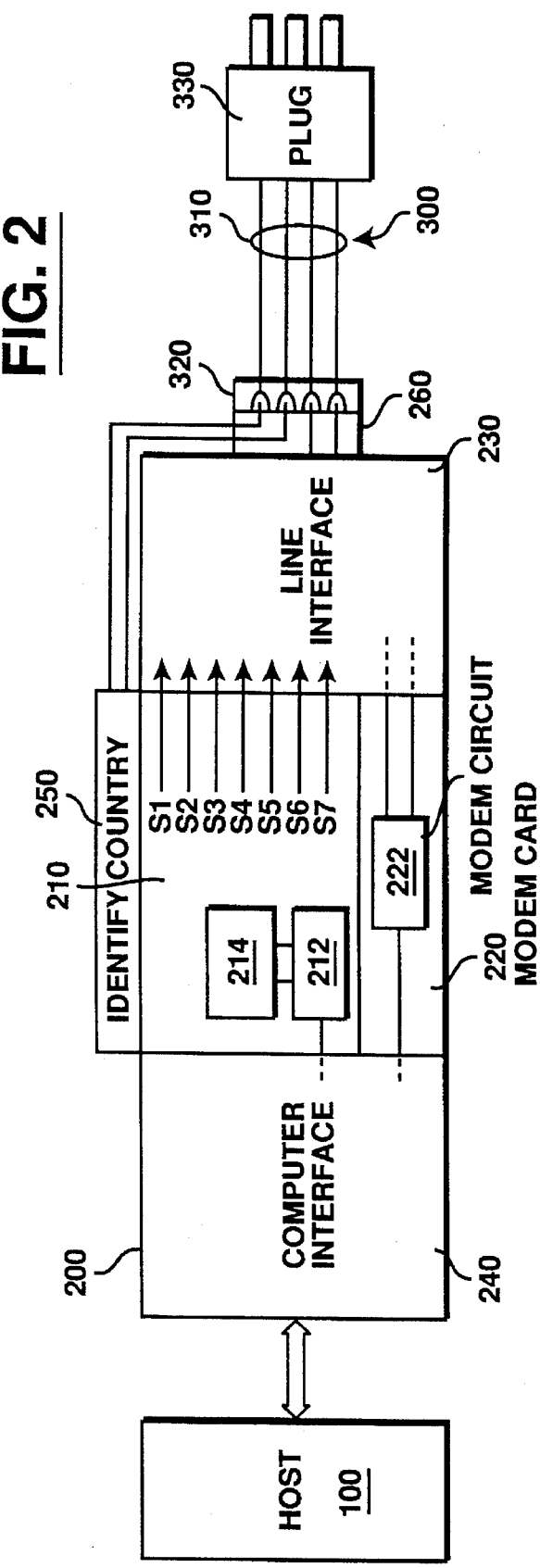

MODEM HAVING AN IMPROVED LINE INTERFACE CIRCUIT, IN PARTICULAR FOR A COMPUTER

This is a continuation of application Ser. No. 07/899,265, filed Jun. 16, 1992, now abandoned.

The present invention relates in general to a modulator/demodulator (modem) for a computer or the like.

BACKGROUND OF THE INVENTION

Personal computers are being equipped more and more frequently with modems, enabling them to communicate with remote computers via the telephone network.

Simultaneously, portable computers are being used more and more, and they have the specific purpose of travelling with their users and thus of being used in different countries.

However, in most countries, any device, such as a modem, for connection to the public telephone network of the country, must be specifically approved ("PTT approved"), which approval is obtained by a special approval procedure, and has the purpose of ensuring that certain electrical characteristics of the device are suitable for operating on the network. These electrical characteristics vary from one country to another.

Thus, to be able to use a portable computer with its modem in different countries, it is necessary at present to possess a plurality of interchangeable modem cards, each approved for a specific country. This procedure is naturally expensive and bulky, thereby causing a portable computer to lose much of its theoretical advantage, in practice.

To mitigate this drawback, proposals have already been made in the prior art to provide a modem fitted with a modulator/demodulator circuit associated with a computer interface circuit, which circuits are common for all countries, and a telephone line interface circuit which varies depending on the country of use. Thus, a portable computer user who desires to be able to connect the computer to the public telephone networks of different countries merely needs to possess a single main modem card which is permanently installed in the computer, together with a plurality of telephone line interfaces. Such modems are described in FR-A-2 652 173 and EP-A-0 309 627.

However, the above-mentioned drawbacks are not eliminated, they are merely reduced. The user still needs to possess a plurality of different telephone line interface boxes, and must swap them over as necessary each time the computer is to be connected to the public telephone network of a new country.

The present invention seeks to eliminate the said drawbacks and to provide a modem for which the circuitry is identical for all countries, with hardware matching being performed for use in different countries without physically removing or adding components, and in a manner that is transparent to the user.

SUMMARY OF THE INVENTION

To this end, in a first aspect, the present invention provides a modem for connecting a computer or the like to a line of a telephone network, the modem being of the type that includes a control logic circuit and a modulator/demodulator circuit, a computer interface circuit, and a telephone line interface circuit, wherein the telephone line interface circuit comprises:

a plurality of terminals for control signals;

switching means controlled by the control signals; and a plurality of components connected to the switching means so as to cause the AC impedance and DC voltage/current characteristics of the circuit to vary as a function of the received control signals;

wherein an identification circuit is also provided including means for reading information representative of the country in which the modem is being used, which information is contained in means for connecting the modem to the telephone line; and wherein the control logic circuit is suitable for applying control signals that are determined as a function of the information read to the telephone line interface circuit.

In another aspect, the present invention provides a modem for connecting a computer to a line of a telephone network, the modem being of the type comprising a control logic circuit and a modulator/demodulator, a computer interface circuit and a telephone line interface circuit, wherein the modem comprises:

an AC loop including an impedance matching transformer and a capacitor connected in series on the telephone line;

a DC loop comprising a rectifier bridge whose input is connected to the line and whose output is connected to a series connection of a circuit that is resistive and optionally inductive, together with means for opening and closing the DC loop;

first switching means for varying the impedance of the AC loop at the side of the transformer other than its side connected to the telephone line;

second switching means for varying the configuration of the resistive circuit in the DC loop; and means for reading information representative of the country in which the modem is being used and contained in means for linking the modem to the telephone line, thereby enabling the first and second switching means to be controlled as a function of the information as read.

BRIEF DESCRIPTION OF THE DRAWINGS

Embodiments of the invention are described by way of example with reference to the accompanying drawings, in which:

FIG. 2 is an overall diagrammatic view of a modem incorporating the above interface circuit;

DETAILED DESCRIPTION

As an initial point, it should be observed that elements or portions that are identical are similar from one figure to another are designated in all of them by the same reference symbols.

Conventionally, there are two parameters of public telephone lines that vary from one country to another. Firstly there is the DC characteristic, also referred to as the "voltage/current limit" which applies when using DC currents for signalling purposes (on-hook, off-hook, pulse dialing, . . . ). The other parameter is the matching impedance of the speech circuit, i.e. for AC signals.

Table I below summarizes the values required for these two parameters in various countries:

TABLE I

| Country | V/I limit (resistance) | Impedance |
| --- | --- | --- |
| Belgium | <250 Ω | 600 Ω |
| Canada | <200 Ω | 600 Ω |
| Denmark | ≈400 Ω | 600 Ω |
| Ireland | <200 Ω | 600 Ω |
| France | PTC//900 Ω | 600 Ω |
| Italy | PTC//900 Ω | 600 Ω |
| Japan | <200 Ω | 600 Ω |
| Norway | ≈400 Ω | 120 Ω + (820 Ω//110nF) |
| Luxembourg | ≈400 Ω | 600 Ω |
| Netherlands | ≈400 Ω | 600 Ω |
| United Kingdom | <200 Ω | 600 Ω |
| Switzerland | ≈400 Ω | 220 Ω + (820 Ω//115nF) |
| Sweden | ≈400 Ω | 600 Ω |
| United States | <200 Ω | 600 Ω |

(The symbol "+" designates a series connection, whereas the symbol "//" designates a parallel connection. PTC designates a positive temperature coefficient thermistor.)

Figure 1:
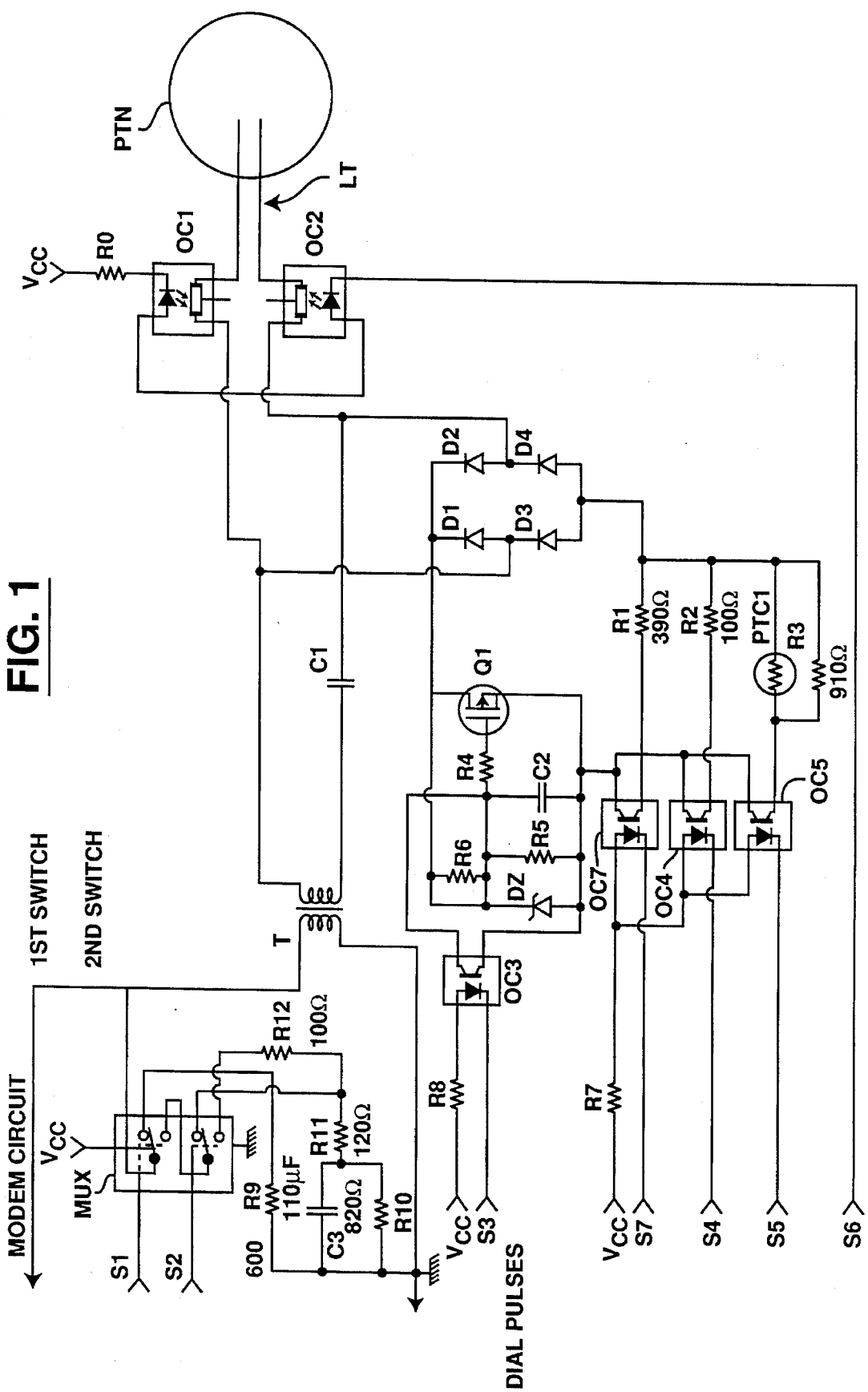
FIG. 1 is an electrical circuit diagram of a line interface circuit for a modem of the present invention.

An electronic circuit constituting a programmable line interface, i.e. an interface enabling the values of the above parameters as required by different countries to be provided merely by applying appropriate commands, is described below with reference to FIG. 1.

The reference PTN designates the public telephone network, with the two wire line to which the modem is connected being referenced LT.

The line LT is connected to the two terminals of a first winding of an impedance-matching transformer T via two line switches implemented in the form of two optocouplers OC1 and OC2. The photosensitive components of the optocouplers are provided on respective ones of the two line wires, while their light-emitting components are connected in series between a positive power supply terminal Vcc (e.g. at +5 volts) and a control input terminal S6 of the interface circuit. A resistor R0 serves to feed the light-emitters (conventionally light-emitting diodes) with an appropriate value of current.

A capacitor C1 is provided in series with said first transformer winding to prevent any direct current flowing therethrough.

The line downstream from the switches OC1 and OC2 is connected to the input of a full-wave rectifier bridge comprising four diodes D1–D4.

The negative output of the rectifier bridge is connected to respective first terminals of three resistors R1–R3 having well-determined resistances, and of a positive temperature coefficient thermistor PTC1 connected in parallel with R3. The second terminals of PTC1 and of R3 are connected together to a second terminal of the photosensitive component of an optocoupler OC5 whose first terminal is connected to the respective first terminals of the photosensitive components of two other optocouplers OC4 and OC7. The second terminal of the photosensitive component of OC4 is connected to the second terminal of R2. The second terminal of the photosensitive of OC7 is connected to the second terminal of R1.

The first terminals of the light-emitting components of OC7, OC4, and OC5 are connected in common to the voltage Vcc via a resistor R7. The second terminals of said light-emitting components are connected to three respective control inputs S7, S4, and S5 of the modem.

The second terminal of R1 is also connected to the negative line of a circuit including a metal oxide silicon field effect transistor (MOS-FET). It is preferable to use an N-channel transistor that is enriched. A positive line of this circuit is connected to the positive output terminal of the rectifier bridge D1–D4. Resistors R5 and R6 connected in series between the negative and positive lines constitute a divider bridge for biasing the grid of the transistor which is referenced Q1. It series resistor R4 is connected between said bridge and the grid. A capacitor C2 and a zener diode DZ are connected in parallel with R5. The two terminals of the photosensitive component of another optocoupler OC3 are connected respectively to the midpoint of the bridge R5, R6 and to the negative line of the transistor circuit. The light-emitting component of OC3 is connected firstly to the source Vcc via a resistor R8, and secondly to a control input terminal S3.

The second winding of the transformer T has a first terminal connected to ground and a second terminal connected to one input of an analog multiplexer or selector MUX. This multiplexer has two select logic inputs controlling the states of two respective switches, as shown. These two logic inputs are connected to two control input terminals S1 and S2 of the line interface circuit. The second terminal of the second winding of T is connected to the moving contact of a first switch whose first stationary contact is connected to a first terminal of a resistor R9. The second terminal of R9 is connected to ground. The second stationary contact of the first switch is connected to the moving contact of the second switch. The first stationary contact of the second switch is connected to the first terminals of two resistors R11 and R12 that are connected in series. The second stationary contact of the second switch is connected to the second terminal of R12, while the second terminal of R11 is connected to a parallel connection of a resistor R10 and a capacitor C3. The other end of said parallel connection is connected to ground.

The second terminal of the second winding of T is also connected to the main circuit of the modem, and in particular to its modulator/demodulator circuit.

The above-described circuit separates an AC loop using T and C1 from a DC loop using the rectifier bridge D1–D4, and one or more of the resistors R1–R3 and PTC1 and the transistor circuit Q1.

The functions of the various control input terminals S1 to S7 of the FIG. 1 circuit are described below. As a preliminary point, it is mentioned that by using optocouplers, absolute electrical isolation is ensured between the digital circuits that control the modem and the telephone line interface. In this respect it may be observed that the transformer T which provides electrical isolation for the analog portion of the circuit may advantageously be replaced by an additional optocoupler. Such an optocoupler would provide the further advantage of a significant reduction in cost and bulk.

By acting on the positions of the switches in the circuit MUX, the terminals S1 and S2 serve to apply the appropriate impedance to the second winding of T as a function of the country in which the modem is being used.

As explained below, the terminal S3 is intended to receive dial pulses from the main modem circuit.

The terminals S7, S4, and S5 serve to change the DC loop resistance of the line interface to satisfy the voltage/current limit required by the country under consideration.

Finally, the purpose of input terminal S6 is to open and close the circuit connected to the line via optocouplers OC1 and OC2 to perform the on/off hook function.

Table II below gives the configuration of the impedance connected to the terminals of the secondary winding of T as a function of the logic levels applied to the control inputs S1 and S2 (where L stands for low, H for high, and X stands for don't care), with level "H" meaning that the switch occupies the position shown in FIG. 1, and with level "L" moving it to the other position.

TABLE II

| S1 | S2 | Impedance across the terminals of the winding |
|---|---|---|
| H | X | R9 |
| L | H | R11 in series with parallel-connected R10 and C3 |
| L | L | R12 and R11 in series with each other and with parallel-connected R10 and C3 |

Thus, by giving resistances of about 600Ω, 820Ω, 120Ω, and 100Ω respectively to R9, R10, R11, and R12, and by giving C3 a capacitance of about 110 nF, it is possible to select one of the various required impedances as given in Table I, depending on the country in which the modem is being used.

As already mentioned, pulse dialing is performed via input terminal S3, and more particularly, by applying zero or low voltage pulses to optocoupler OC3, thereby switching on its LED and essentially short-circuiting the terminals of its photosensitive component. The grid-source voltage of transistor Q1 is thus reduced to a value that causes it to cease conducting. The DC loop is therefore opened; when the input S3 returns to a voltage equal to Vcc, the photosensitive component of OC3 is switched off and because of its bias Q1 becomes conductive again, thereby closing the DC loop. Dialing thus takes place under the control of the main modem circuit by applying desired numbers of pulses S3 at the appropriate rate and mark-space ratio.

Input terminals S7, S4, and S5 serve to adjust the voltage/current characteristic of the DC loop as defined above as a function of the requirements of each country.

More precisely, Table III below gives the resistance connected in series between the rectifier bridge D1–D4 and the transistor circuit Q1 (which resistance may include, where appropriate, a positive temperature coefficient thermistor) as a function of the logic states at terminals S7, S4, and S5 (where H stands for a high voltage close to Vcc (+5 volts), and L stands for a voltage that is low or zero).

TABLE III

|   | S7 | S4 | S5 | Series resistance |
|---|---|---|---|---|
| 1 | H | H | H | ∞ |
| 2 | H | H | L | R3 and PTC1 in parallel |
| 3 | H | L | H | R2 |
| 4 | H | L | L | R2, R3, and PTC1 in parallel |
| 5 | L | H | H | R1 |
| 6 | L | H | L | R1, R3 and PTC1 in parallel |
| 7 | L | L | H | R1 and R2 in parallel |
| 8 | L | L | L | R1, R2, R3, and PTC1 in parallel |

It will thus be understood that by selecting appropriate resistances for R1 to R3, it is possible to obtain the various DC voltage/current characteristics required in various countries as a function of the control signals applied to S7, S4, and S5. For example, R1, R2, and R3 may have the following resistances respectively: 390Ω, 100Ω, and 910Ω. In this way, the T/C limits given in Table I above can be obtained by the signal combinations given at lines 2, 3, and 5 of Table III, and other desirable limit values may also be obtained.

Naturally, provision may be made, if necessary, for the DC loop to include components that exhibit inductive behavior.

As mentioned, terminal S6 serves to perform on/off hook functions. When the level on S6 is low, then the photosensitive components in OC1 and OC2 are conductive (off-hook state), and vice versa.

The general organization of the modem of the invention is shown in FIG. 2.

Reference 100 designates the host computer, which may be of any appropriate type.

The modem 200 includes a control logic circuit 210, e.g. including a processor 212 with a memory 214 containing appropriate programs and input/output circuits (not shown), a main circuit 220 essentially comprising a modulator/demodulator circuit 222, the telephone line interface circuit 230, in particular the circuit shown in FIG. 1, a computer interface circuit 240 providing the interface with the computer 100, and a country-identifying circuit 250 which is described below.

The modem also includes a connector 260 for the link with the telephone network. This link is provided by a cord 300 comprising an appropriate multiconductor cable 310, a modem connector 320 that is complementary to the connector 260, and a telephone network connector 330.

When the modem 200 is used in a given country, it is necessary for the logic signals applied to the terminals S1, S2, S7, S4, and S5 of the line interface circuit 230 to be suitable for configuring said circuit as a function of the voltage/current limit and the impedance as required by that country. It is also necessary for the modem to operate using a protocol that satisfies the requirements of that country, i.e. using a program contained in its memory 214 that complies with the protocol.

The solution which consists in requiring the user to tell the computer which country's telephone network is connected to its modem is not desirable since should an error occur, there is a risk of the line interface configuration that is put into operation being unsuitable for the network in the country in question.

It is known that each country requires a specific type of connector for gaining access to its telephone network. Thus, when the modem of the invention is used in different countries, the user must replace the cord 300 connecting the modem to the telephone network with a new cord that includes the appropriate network connector 330 together with a modem connector 320 which is always the same and which connects to the connector 260, located at the back of the host computer, for example.

In accordance with the present invention, a country-identification process is implemented based on country-specific information contained in the connector 320 or the connector 330 of each country-specific cord, or even in the cable 310 itself.

This information may be of any suitable type. Various possible specific embodiments for specifying information in a connector and for enabling it to be read by the identification circuit 250 are described below with reference to FIGS. 3a to 3h.

Figure 3A:
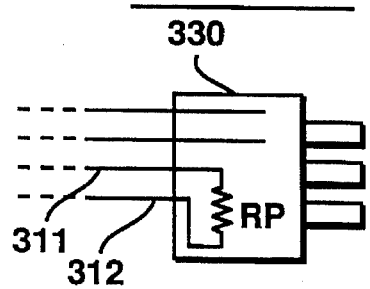
FIGS. 3a to 3h show different embodiments of a detail of the invention.

In the example of FIG. 3a, information is determined by the value of an electrical resistor RP and connectors adapted to the networks of different countries include different easily-distinguished resistances. The cable 310 connecting the connector 300 to the modem includes four conductors, two of the telephone line which are connected to contacts 320 of the connector, and the other two (referenced 311 and 312) being connected to the two terminals of the resistance.

To identify the country corresponding to a cord currently plugged into the modem, the circuit 250 can apply a constant current to the resistance RP and can measure the voltage across its terminals. Appropriate threshold circuits to which said voltage is applied then serve to identify the country.

Figure 3B:
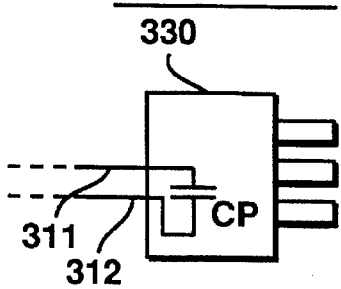

In FIG. 3b, the country information is given by the capacitance of a capacitor CP. This capacitance can be determined by the identification circuit, for example by applying voltage pulses to the terminals of the capacitor and by measuring the rate at which the voltage falls off after the pulse ceases to be applied.

Figure 3C:
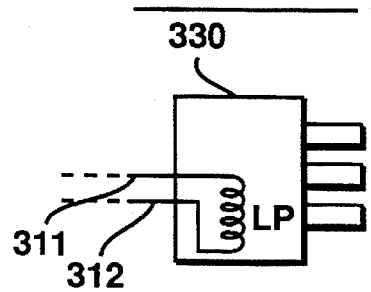

In FIG. 3c, the country information is provided by the inductance of an inductor LP. Under such circumstances, the identification circuit can apply current pulses to the inductor and can measure the speed at which the current falls off at the end of the pulses.

Figure 3D:
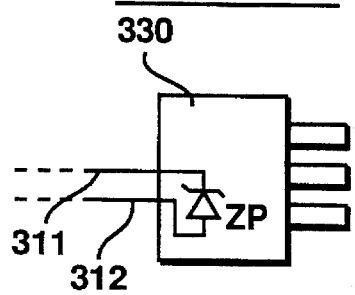

In FIG. 3d, the country information is given by the avalanche voltage of a zener diode ZP. This voltage can be measured by applying a reverse bias voltage to said diode greater than the highest expected zener avalanche voltage in any of the connectors, said voltage being applied via a resistor so that the voltage that appears across the terminals of the diodes can be compared with a plurality of thresholds, in a manner analogous to using a resistance.

Figure 3E:
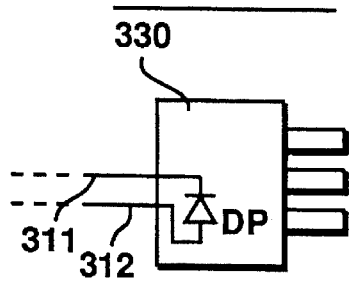

In the example shown in FIG. 3e, country information is given by the forwards voltage drop when an ordinary diode DP conducts. The way in which this information is read for the purpose of identifying the country is similar to that described above for a zener diode.

Figure 3F:
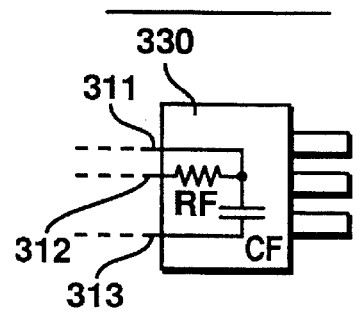

It is also possible to provide a combination of passive components in the connector 330, thereby forming a filter. Thus, FIG. 3f shows a first order lowpass RC filter constituted by a resistance RF and a capacitance CF. In this case, three conductors 311, 312, and 313 are provided in the cable. Country information is given by the cutoff frequency of the filter. A country can be identified by applying an alternating voltage at fixed frequency to the filter from an identification circuit, and by measuring its attenuation which is representative of its cutoff frequency.

Figure 3G:
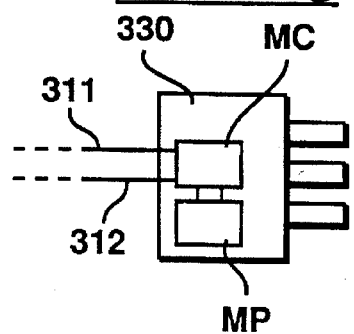

The embodiment shown in FIG. 3g makes use of a microcontroller MC associated with a memory MP, e.g. a read only memory (ROM) containing a digital value representative of the country-identifier. The microcontroller may respond to a request from the identification circuit by reading the contents of the memory MP and by transmitting it to said circuit serially. To minimize the bulk of the microcontroller and its memory, the person skilled in the art will be able to base a design on the microcircuits used for "smart" cards or the like, for example.

Figure 3H:
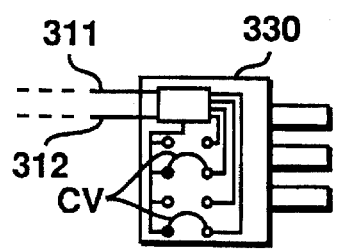

In the embodiment of FIG. 3h, the connector includes a plurality of removable jumper straps CV which specify a digital country-identification code by being present or absent in various different positions, which code can be read by means of a circuit of the type described in French patent application No. 2 652 173 mentioned in the introduction, for example.

In the embodiments of FIGS. 3a to 3h, the component or components providing country information are incorporated in the telephone network connector 330 of the cord. In a variant embodiment, said component or components may naturally be provided in the modem end connector of the cord. This reduces the number of wires required in the multiwire cable 310.

Figure 4A:
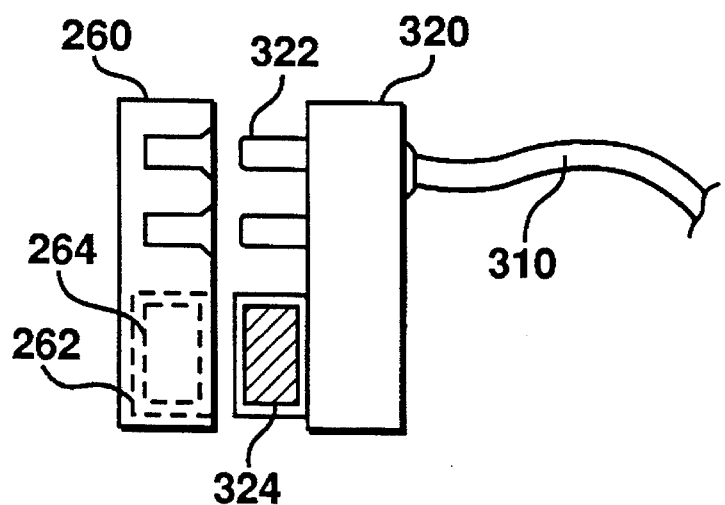
FIGS. 4a and 4b show two embodiments of a variant of the detail.

Another variant is described below with reference to FIG. 4a. In this case, the connector 320 of the cord includes a plate 324 in the vicinity of its pins 322 (male pins in the present case), which plate 324 carries information. When complementary connectors 320 and 260 are fitted together, the plate engages in a complementary housing 262 of the connector 260, which housing is provided with means for reading information and diagrammatically referenced 264.

The information may be optical and it may be implemented, for example, in the form of a bar code, or else it may be magnetic, or it may be of some other kind. In a variant, the plate 324 may include a microcontroller and a memory, with connection being provided via surface contacts provided on the plate.

Figure 4B:
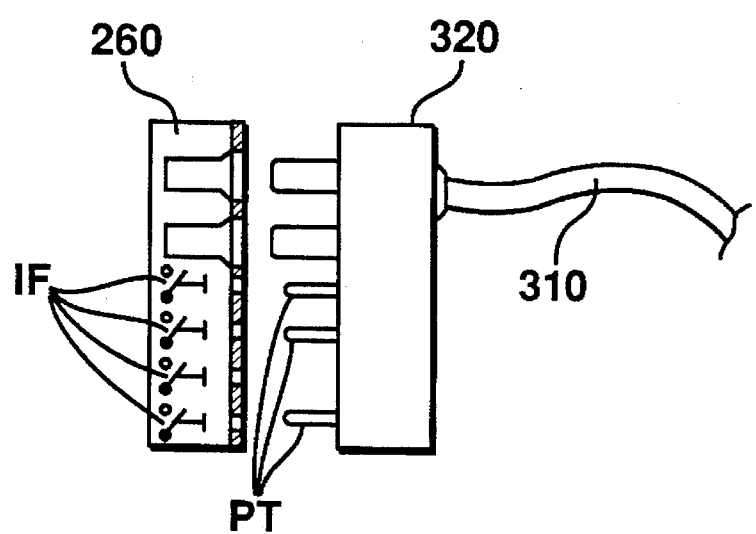

In another variant shown in FIG. 4b, the connector 320 of the cord includes a set of tabs or the like PT which, when said connector is associated with a complementary connector 260, are capable of mechanically engaging transient switches IF situated in the housing of the connector 260. Depending on the number and positions of the tabs PT, a special pattern of open/closed states is established for the switches, which states can be read by appropriate means and represent the country for which the modem should be configured. For example, with four tab locations, $2^4=16$ different country codes can be defined.

For example, country identification may be performed each time the computer is switched on, and, where appropriate, at the beginning of each procedure for making or receiving a call.

In the event that the logic circuit 210 of the modem observes that the identification it is reading corresponds with the current set of parameters of the modem (software and hardware), then no further operation needs to be performed. However, when a difference is detected, then the modem program corresponding to the country whose identifier has just been read is loaded into the memory 214 of the modem, e.g. from a floppy disk or a hard disk of the computer 100, and appropriate control signals are applied to the terminals S1–S2 and S7, S4, S5 of the line interface circuit so as to obtain the required voltage/current characteristic and the required impedance.

Naturally, the present invention is not limited to the embodiment described above and shown in the drawings, and the person skilled in the art will be able to make variants and modifications that are in accordance with the spirit thereof.

In particular, the invention is applicable to a modem or the like that needs to be adaptable to all kinds of telephone networks, whether public or private.

We claim:

1. Circuitry for providing a telephone line interface circuit of a MODEM for a computer with an AC impedance and DC voltage/current characteristics required by a given type telephone network such that the telephone line interface circuit can be matchingly connected with the given type telephone network, wherein the given type telephone network provides an identification code representative of the required AC impedance and DC voltage/current characteristics, wherein the circuitry comprises:

(A) a plurality of impedance components, wherein the plurality of impedance components, when connected to the telephone line interface circuit, determine the AC impedance and DC voltage/current characteristics of the telephone line interface circuit;

(B) a plurality of terminals coupled to receive a plurality of control signals associated with the identification code;

(C) a switching logic coupled (1) between the plurality of impedance components and the telephone line interfacing circuit and (2) to the plurality of terminals for selectively connecting the plurality of impedance components to the telephone line interface circuit under the control of the plurality of control signals so as to cause the telephone line interface circuit to have the required AC impedance and DC voltage/current characteristics; and (D) an identifying circuit coupled to the given type telephone network and the plurality of terminals for identifying the required AC impedance and DC voltage/current characteristics by receiving the identification code and converting the identification code into the plurality of control signals, wherein the identifying circuit automatically receives the identification code from a connector of the given type of telephone network absent of any control from a user of the MODEM when the MODEM is connected to the connector of the given type of telephone network, wherein the identification code is a hardware implemented value.

2. The circuitry of claim 1, wherein the plurality of impedance components comprise resistors, capacitors, inductors, diodes, Zener diodes, and transistors.

3. The circuitry of claim 2, wherein the plurality of impedance components further comprise a positive temperature coefficient thermistor.

4. The circuitry of claim 1, wherein the switching logic comprises semiconductor switches and optocouplers.

5. The circuitry of claim 1, wherein the identifying circuit receives the identification code from an electronic component in a connector that couples the telephone line interface circuit to the given type telephone network, wherein the value of the electronic component is associated with the identification code.

6. The circuitry of claim 5, wherein the electronic component is selected from a group of elements comprising resistors, capacitors, inductors, diodes, Zener diodes, and combinations thereof.

7. A MODEM for a computer, comprising:

(A) a connector for coupling the MODEM to a given type telephone network, wherein the connector includes an identification code representative of an AC impedance and DC voltage/current characteristics required by the given type telephone network, wherein the identification code is a hardware implemented value in the connector;

(B) a telephone line interface circuit coupled to the given type telephone network via the connector;

(C) circuitry coupled to the telephone line interface circuit and the connector for providing the telephone line interface circuit with the AC impedance and DC voltage/current characteristics required by the given type telephone network such that the telephone line interface circuit can be matchingly connected with the given type telephone network via the connector, wherein the circuitry further comprises (i) a plurality of impedance components, wherein the plurality of impedance components, when connected to the telephone line interface circuit, determine the AC impedance and DC voltage/current characteristics of the telephone line interface circuit;

(ii) a plurality of terminals coupled to receive a plurality of control signals associated with the identification code;

(iii) a switching logic coupled (1) between the plurality of impedance components and the telephone line interfacing circuit and (2) to the plurality of terminals for selectively connecting the plurality of impedance components to the telephone line interface circuit under the control of the plurality of control signals so as to cause the telephone line interface circuit to have the required AC impedance and DC voltage/current characteristics; and (iv) an identifying circuit coupled to the connector and the plurality of terminals for identifying the required AC impedance and DC voltage/current characteristics by receiving the identification code from the connector and converting the identification code into the plurality of control signals, wherein the identification circuit automatically receives the identification code from the connector absent of any control from a user of the MODEM when the circuitry is coupled to the connector.

8. The MODEM of claim 7, wherein the connector further comprises a resistor the resistance of which determines the identification code.

9. The MODEM of claims 7, wherein the connector further comprises a capacitor the capacitance of which determines the identification code.

10. The MODEM of claim 7, wherein the connector further comprises an inductor the inductance of which determines the identification code.

11. The MODEM of claim 7, wherein the connector further comprises a diode the bias voltage of which determines the identification code.

12. The MODEM of claim 7, wherein the connector further comprises a filter the cut-off frequency of which determines the identification code.

13. The MODEM of claim 7, wherein the connector further comprises a plurality of jumps the presence of which determines the identification code.

14. A computer system, comprising:

(A) a host computer circuit;

(B) a MODEM coupled to the host computer circuit for coupling the host computer circuit to a given type of telephone network for data transmission, wherein the MODEM further comprises (a) a connector for coupling the MODEM to the given type telephone network, wherein the connector includes an identification code representative of an AC impedance and DC voltage/current characteristics required by the given type telephone network, wherein the identification code is a hardware implemented value in the connector;

(b) a telephone line interface circuit coupled to the given type telephone network via the connector;

(c) circuitry coupled to the telephone line interface circuit and the connector for providing the telephone line interface circuit with the AC impedance and DC voltage/current characteristics required by the given type telephone network such that the telephone line interface circuit can be matchingly connected with the given type telephone network via the connector, wherein the circuitry further comprises (i) a plurality of impedance components, wherein the plurality of impedance components, when connected to the telephone line interface circuit, determine the AC impedance and DC voltage/current characteristics of the telephone line interface circuit;

(ii) a plurality of terminals coupled to receive a plurality of control signals associated with the identification code;

(iii) a switching logic coupled (1) between the plurality of impedance components and the telephone line interfacing circuit and (2) to the plurality of terminals for selectively connecting the plurality of impedance components to the telephone line interface circuit under the control of the plurality of control signals so as to cause the telephone line interface circuit to have the required AC impedance and DC voltage/current characteristics; and (iv) an identifying circuit coupled to the connector and the plurality of terminals for identifying the required AC impedance and DC voltage/current characteristics by receiving the identification code from the connector and converting the identification code into the plurality of control signals, wherein the identification circuit automatically receives the identification code from the connector absent of any control from a user of the MODEM when the circuitry is coupled to the connector.

15. The computer system of claim 14, wherein the identifying circuit receives the identification code from an electronic component in the connector, wherein the value of the electronic component is associated with the identification code.

16. The computer system of claim 15, wherein the electronic component is selected from a group of elements comprising resistors, capacitors, inductors, diodes, Zener diodes, and combinations thereof.

17. The computer system of claim 14, wherein the plurality of impedance components comprise resistors, capacitors, inductors, diodes, Zener diodes, and transistors.

18. The computer system of claim 14, wherein the switching logic comprises semiconductor switches and optocouplers.

* * * * *